United States Patent
Gasser

(10) Patent No.: US 9,086,099 B2
(45) Date of Patent: Jul. 21, 2015

(54) ROTOR COUPLING

(75) Inventor: Daniel Gasser, New South Wales (AU)

(73) Assignee: Das Werk Pty Ltd, Tamarama, New South Wales (AU)

( * ) Notice: Subject to any disclaimer, the term of this patent is extended or adjusted under 35 U.S.C. 154(b) by 678 days.

(21) Appl. No.: 13/391,325

(22) PCT Filed: Jul. 6, 2010

(86) PCT No.: PCT/AU2010/000859
§ 371 (c)(1),
(2), (4) Date: Feb. 20, 2012

(87) PCT Pub. No.: WO2011/020138
PCT Pub. Date: Feb. 24, 2011

(65) Prior Publication Data
US 2012/0148408 A1    Jun. 14, 2012

(30) Foreign Application Priority Data

Aug. 21, 2009    (AU) ................ 2009904035

(51) Int. Cl.
*F04D 29/66* (2006.01)
*F16D 3/205* (2006.01)
*F16D 3/20* (2006.01)
(Continued)

(52) U.S. Cl.
CPC ............... *F16D 3/20* (2013.01); *F04D 29/263* (2013.01); *F04D 29/662* (2013.01); *F16D 3/205* (2013.01); *F04D 29/329* (2013.01)

(58) Field of Classification Search
CPC ..... F04D 29/263; F04D 29/329; F04D 29/66; F04D 29/661; F04D 29/662; F04D 29/668; F16D 3/20; F16D 3/205

USPC ............. 415/218.1; 416/131, 135, 136, 139, 416/144, 145, 244 R, 245 R, 245 A, 244 B, 416/500; 464/112, 120
See application file for complete search history.

(56) References Cited

U.S. PATENT DOCUMENTS

| | | | |
|---|---|---|---|
| 3,019,039 A | | 1/1962 | Clavell |
| 3,098,365 A | * | 7/1963 | Pearson .................. 464/120 |
| 3,160,020 A | * | 12/1964 | Braskamp .................. 74/86 |

(Continued)

FOREIGN PATENT DOCUMENTS

| | | |
|---|---|---|
| CN | 1090633 | 8/1994 |
| DE | 132884 | 11/1978 |

(Continued)

OTHER PUBLICATIONS

International Search Report prepared by the Australian Patent Office on Aug. 25, 2010, for International Application No. PCT/AU2010/000859.

(Continued)

*Primary Examiner* — Justine Yu
*Assistant Examiner* — Jason Davis
(74) *Attorney, Agent, or Firm* — Sheridan Ross P.C.

(57) ABSTRACT

A rotor coupling (10) including a first member (12) rotatable about a first axis of rotation (14) and a second member (16), engageable with the first member, and rotatable about a second axis of rotation (18). The rotor coupling (10) further includes at least one torque pin (24) for transmitting torque between the first and second members such that the first and second axes of rotation are allowed to respectively angularly vary during rotation of the rotor coupling.

15 Claims, 8 Drawing Sheets

(51) Int. Cl.
*F04D 29/26* (2006.01)
*F04D 29/32* (2006.01)

(56) References Cited

U.S. PATENT DOCUMENTS

| | | | |
|---|---|---|---|
| 4,065,219 | A | 12/1977 | Levine |
| 4,114,401 | A | 9/1978 | Van Hoose |
| 5,931,056 | A | 8/1999 | Tsaur |
| 6,139,279 | A | 10/2000 | Pearce et al. |
| 7,332,838 | B2 * | 2/2008 | Akiba ............... 310/62 |
| 2004/0013517 | A1 * | 1/2004 | Adrian ............ 415/119 |
| 2007/0042826 | A1 | 2/2007 | Furusawa |
| 2007/0237641 | A1 | 10/2007 | Tsao |
| 2008/0020701 | A1 | 1/2008 | Tsaur |
| 2008/0193287 | A1 | 8/2008 | Kobayashi et al. |
| 2009/0041582 | A1 | 2/2009 | Liang et al. |

FOREIGN PATENT DOCUMENTS

| | | |
|---|---|---|
| EP | 0149589 B1 | 3/1988 |
| EP | 1936206 | 6/2008 |
| GB | 2291134 | 1/1996 |
| JP | 63-235695 | 9/1988 |
| JP | H03-80126 | 8/1991 |
| JP | 2001-027197 | 1/2001 |
| JP | 2003-189399 | 7/2003 |
| JP | 2005-509109 | 4/2005 |
| JP | 2007-194058 | 8/2007 |
| JP | 2008-175142 | 7/2008 |
| JP | 2008-219093 | 9/2008 |
| KR | 20070064301 | 6/2007 |

OTHER PUBLICATIONS

International Preliminary Report on Patentability prepared by the Australian Patent Office on Sep. 29, 2011, for International Application No. PCT/AU2010/000859.

Response to Written Opinion dated Sep. 22, 2011, for International Application No. PCT/AU2010/000859.

* cited by examiner

ROTOR COUPLING

CROSS REFERENCE TO RELATED APPLICATIONS

This application is a national stage application under 35 U.S.C. 371 of PCT Application No. PCT/AU2010/000859 having an international filing date of 06 Jul. 2010, which designated the United States, which PCT application claimed the benefit of Australian Patent Application No. 2009904035 filed 21 Aug. 2009, the entire disclosure of each of which is incorporated herein by reference.

TECHNICAL FIELD

The present invention relates to rotor couplings and in particular to rotor couplings for fluid displacement devices.

The invention has been developed primarily for use as a rotor coupling for an air fan rotor or impeller pump and will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

It is known that the greater the air velocity from an air fan, the greater the noise generated. This generated noise can be a problem in confined areas, especially in areas shared by humans. This problem is no better exemplified than it is in a room ceiling fan where such noise is undesirable. To this end, it is known that the design of a ceiling fan has been limited by the amount of noise it generates relative to the amount of airflow and cooling effect provided.

Also, in the field of personal computers and peripheral devices such as printers and computer monitors, noise generated by the cooling fans can also be of concern to the users of these devices. At the same time, there is also a greater demand on such fans to displace the ever increasing heat generated.

Generally speaking, the more airflow a cooling fan can produce the better cooling effect created. The two basic ways of increasing the airflow of a fan is to increase the rotational speed of the fan rotor or increase the size of the fan rotor so that the blades move more air. However, the drawbacks of these methods are excessive power consumption and, as previously mentioned, noise. The same concerns can equally apply to other fluid movement devices such as axial flow pumps.

Various technologies have been developed in recent years for reducing noise generated by air and liquid movement devices. In Japanese Patent No. 10-197953 a fan noise separation system is taught including a grid member with a plurality of rectangular or circular openings located in an upstream air flow position proximate an air fan. In Japanese Patent No. 10-141294, a technique is disclosed for reducing noise using a barrier wall located within the blades of the impeller and which suppress the vortex flow. It is noted that in both these documents, a method of masking the noise only is presented and the cause of the noise is not addressed.

Accordingly, what is needed is a fan/rotor assembly that allows increased fluid flow without necessarily increasing the amount of noise generated. Ideally, it would also be desirable to increase the efficiency of the fan/rotor assembly.

It is an object of the present invention to overcome or ameliorate at least one of the disadvantages of the prior art, or to provide a useful alternative.

It is an object of a preferred form of the present invention to provide a rotor coupling for a fluid displacement device such an air fan that reduces the noise generated by the fluid movement.

SUMMARY OF THE INVENTION

According to a first aspect, the present invention provides a rotor coupling for an air displacement rotot, said coupling including:

a first member rotatable about a first axis of rotation;

a second member substantially disposed within a hub of said air displacement rotor, said second member being in angularly variable engagement with said first member for allowing said second member and said hub to rotate about a second axis of rotation; and at least one torque pin for transmitting torque between the first and second members, wherein said first and second axes of rotation are freely angularly variable with respect to each other upon rotation of said air displacement rotor such that said rotation is substantially self-balancing air displacement.

In one embodiment, the at least one torque pin protrudes from the surface of the first member.

In one embodiment, the rotor coupling includes at least one elongate recess for engagement with the at least one torque pin.

In one embodiment, the rotor coupling includes a bearing surface for supporting bearing contact with the first member.

In one embodiment, the first member includes a part spherical portion. Preferably, the at least one torque pin radially protrudes from the surface of the part spherical portion.

In one embodiment, the bearing surface is in sliding support engagement with the part spherical portion of the first member. Preferably, the bearing surface is adapted for complementary engagement with the part spherical portion of the first member.

In one embodiment, the second member includes the bearing surface.

In one embodiment, the second member includes a bearing ring, the bearing ring including a bearing surface In one embodiment, the rotor coupling includes two torque pins. In this embodiment, the rotor coupling includes two corresponding elongate recesses.

In one embodiment, the rotor is in the form of a fan having the hub and a plurality of radially extending fan blades.

In one embodiment, the first member is adapted for coupling with a prime mover. Preferably, the prime mover is an electric motor.

In one embodiment, the first member is adapted for coupling with a prime mover. Preferably, the prime mover is an electric motor.

According to a further aspect, there is provided an air fan including the rotor coupling according to the first aspect.

In one embodiment, the air fan is a ceiling fan.

In one embodiment, the air fan is a cooling fan for an electrical appliance.

According to a further aspect, there is provided a liquid pump including the rotor coupling according to the first aspect.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Reference throughout this specification to "frusto-spherical" means a spherical shape having one or more tips that have been truncated by one or more planes.

BRIEF DESCRIPTION OF THE DRAWINGS

Preferred embodiments of the invention will now be described, by way of example only, with reference to the accompanying drawings in which.

Figure 1:
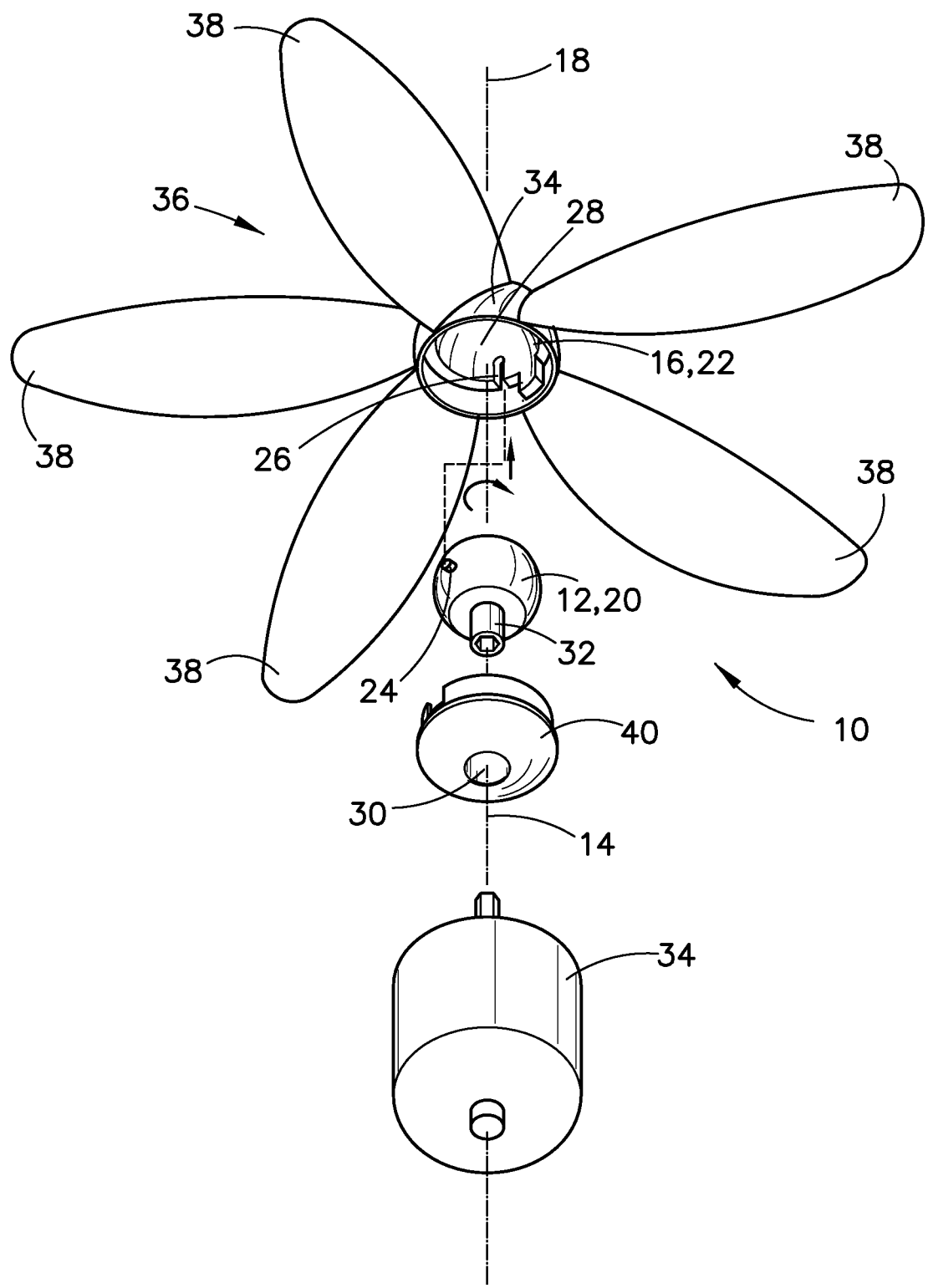
FIG. 1 is an exploded perspective view of a rotor coupling in accordance with a first embodiment of the present invention.
Figure 2:
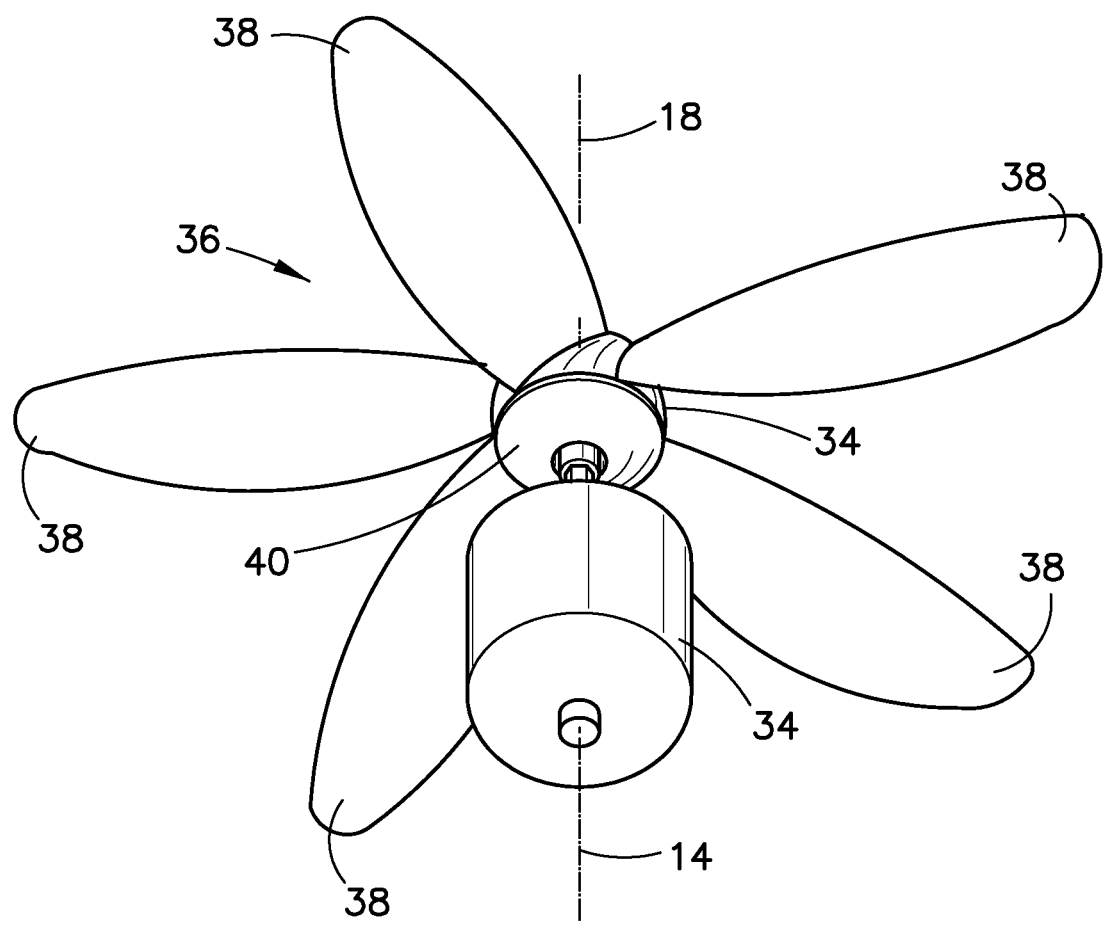
FIG. 2 is an assembled perspective view of the rotor coupling of FIG. 1.

DESCRIPTION OF PREFERRED
EMBODIMENTS OF THE INVENTION

Exemplary embodiments of the present invention will now be described in detail with reference to the annexed drawings. In the drawings, the same elements are denoted by the same reference numerals throughout. In the following description, detailed descriptions of known functions and configurations incorporated herein have been omitted for conciseness and clarity.

Referring to the accompanying drawings, there is provided a rotor coupling 10 including a first member 12 rotatable about a first axis of rotation 14 and a second member 16 engageable with the first member, and rotatable about a second axis of rotation 18. In the embodiment illustrated in FIGS. 1 to 4, the first member 12 is in the form of a part spherical shape or frusto-spherical male member 20 i.e. a spherical shape that has been truncated by two parallel planes. The second member is in the form of a complementary female socket 22. The rotor coupling 10 further includes at least one torque pin 24 for transmitting torque between the first and second members such that the first and second axes of rotation are allowed to respectively angularly vary during rotation of the rotor coupling.

Figure 3:
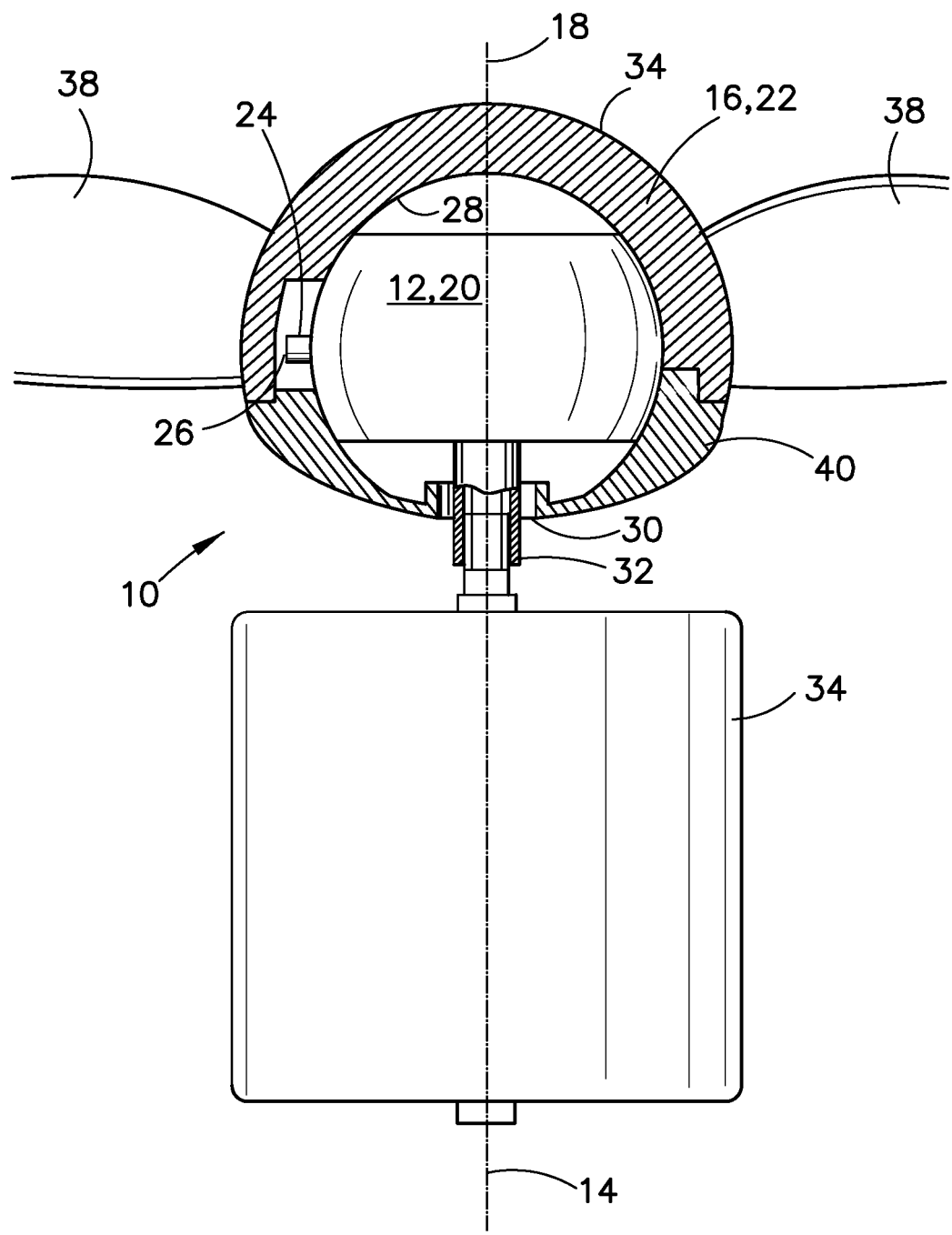
FIG. 3 is sectioned elevation view of the rotor coupling of FIG. 1, in a first state of operation.
Figure 4:
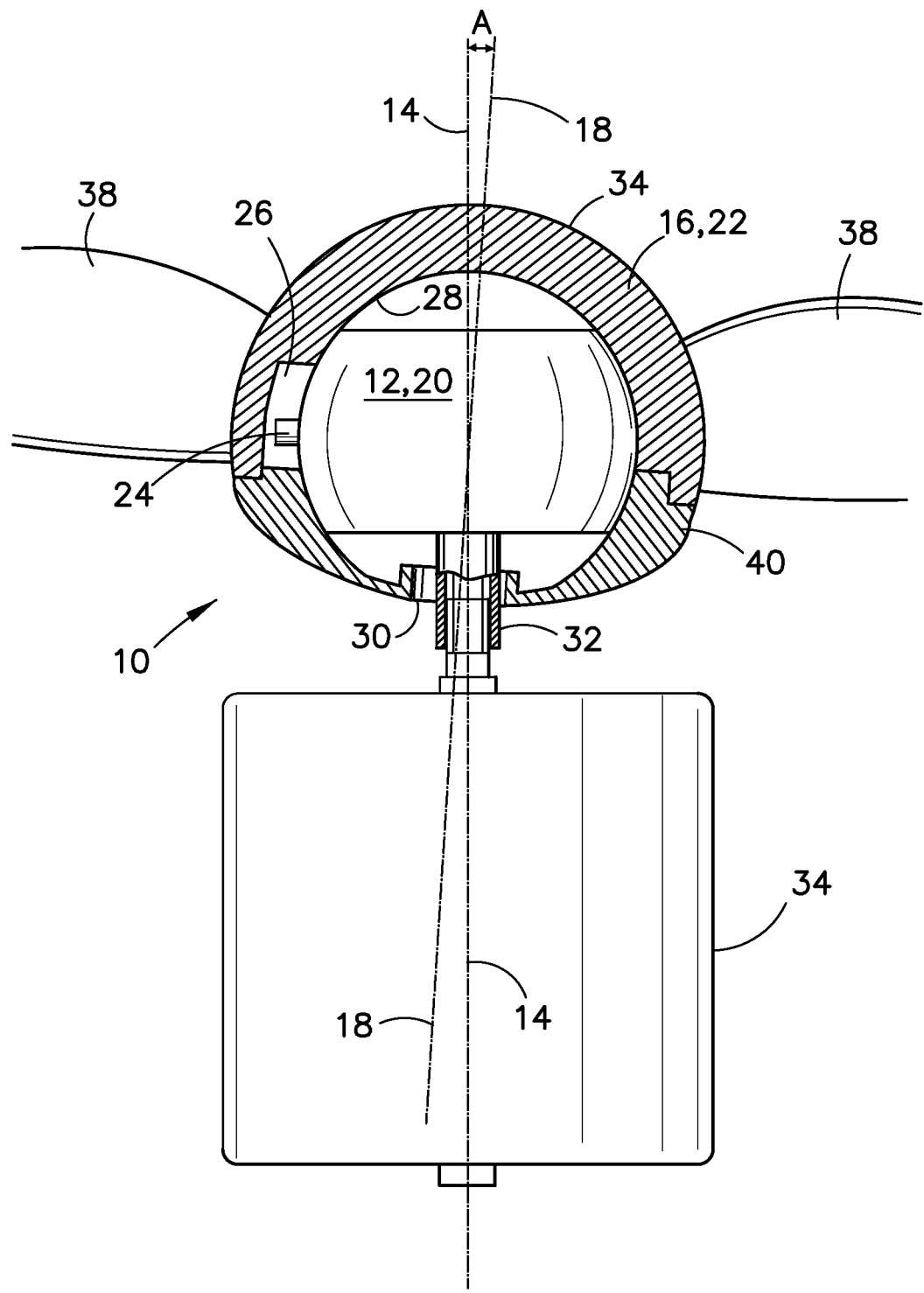
FIG. 4 is sectioned elevation view of the rotor coupling of FIG. 1, in a second state of operation.

As best shown in FIGS. 1, 3 and 4, the torque pin radially protrudes from the highest point of the spherical surface of the male member 20 to engage an elongate recess 26 in the female socket 22 upon assembly. The female socket includes a bearing surface 28 for supporting sliding engagement of the male member 20. In order to facilitate this engagement, the bearing surface 28 is configured to be complementary to the spherical surface of the male member. Using this arrangement, the male member 20 is secured in position whilst the first rotation axis 14 can angularly vary with respect to the second rotation axis 18. During this angular variation the torque pin 24 remains in the elongate recess 26 to transmit torque from the male member 20 to the female socket 22 during rotation of the rotor coupling 10. It will be appreciated that the maximum angular movement is limited by the clearance provided by aperture 30 and the length of the elongate recess 26. This angular variation is best demonstrated in FIGS. 3 and 4, which depict a cross sectional view of the rotor coupling 10 in two states of angular variation whereby the angular variation is generally indicated by angle A.

Returning to FIGS. 1 and 2, the male member 20 includes an input shaft 32, which is adapted for engagement with an electric motor 34 or other prime mover to provide input torque. The female socket member 22 is integrally formed within the hub 34 of a fan rotor 36 having a plurality of radially extending fan blades 38.

It should be understood that by means of its resistance to cross sectional shear deformation or failure, the torque pin 24 provides a limit to the amount of torque transmitted from the electric motor 34 to the fan rotor 36. In the case of potential fan blade obstruction, the torque pin 24 is designed to fail at a pre-determined torque limit and therefore advantageously fails before other more expensive components such as the electric motor. In this respect, in a further embodiment discussed below, more than one torque pin can be used to transmit relatively more torque. Similarly, a larger torque pin and corresponding slot can be provided to transmit more torque.

As mentioned earlier, according to the illustrated embodiment the rotor coupling 10 is used in an air fan. More particularly, as shown on FIGS. 1 to 4 the rotor coupling is used on a ceiling fan. In this application, a cover 40 having the aperture 30 is also provided to retain the male member in position and generally limit the ingress of dirt. As can be seen, the cover 40 has an inner surface that provides further supporting sliding engagement of the male member 20. In a further variation, the second member 22 includes the cover 40. Advantageously, using this arrangement, the fan rotor is rotationally driven and yet is able to have an axis of rotation that freely varies with respect to output shaft of the prime mover.

It should be noted that a fan rotor that is able to freely angularly vary, is a fan rotor that self balances, or finds its ideal relative angular position during its rotation. It is submitted that a self balancing fan rotor, in turn, has far less blade and drive vibration or wobble, thereby resulting in reduced noise and reduced power consumption relative to the airflow provided. Without wishing to limit the scope of the invention to one theoretic postulation, it is thought that the reason for the self balancing affect is that the free flow of airflow angles provided allows for less counteracting and axial forces on the fan blades. Advantageously, because of less vibration forces, there is also less stress of the components resulting in increased component durability.

It is envisaged that in this embodiment, the main components are formed predominantly from commonly known plastics and/or metallic materials. To this end, the rotor coupling should be able to operate satisfactorily even with substantial ingress of debris or dirt particles. However, it will be appreciated that in other not shown variations, other materials can be used and/or the rotor coupling completely sealed using flexible covers and/or a lubricant provided.

More specifically, the components may be formed from high-density, low friction plastics materials such as high-density polyethylene, Delrin®, Acetyl, Teflon, nylon or a combination thereof in order to operate substantially lubricant free as well as being durable and quiet in operation. The torque pin can be co-formed with the first member or from a separate component formed from stainless steel or chrome steel or even brass having known failure loads and the fan blades formed from ABS, ABS blend, carbon fibre or even glass filled nylon as is commonly known in the art.

Accordingly, using rotor coupling 10, the illustrated fan is able to advantageously rotate at a faster velocity than prior art fans to increase the airflow provided and the resulting cooling affect whilst generating relatively less noise because the fan rotor is self balanced. At the same time, the rotor coupling takes up no extra space relative to prior art ceiling fans and appears visually no different. The drive motor may be concealed above the ceiling making it ideal for low ceiling heights and inclined ceiling surfaces.

Figure 5:
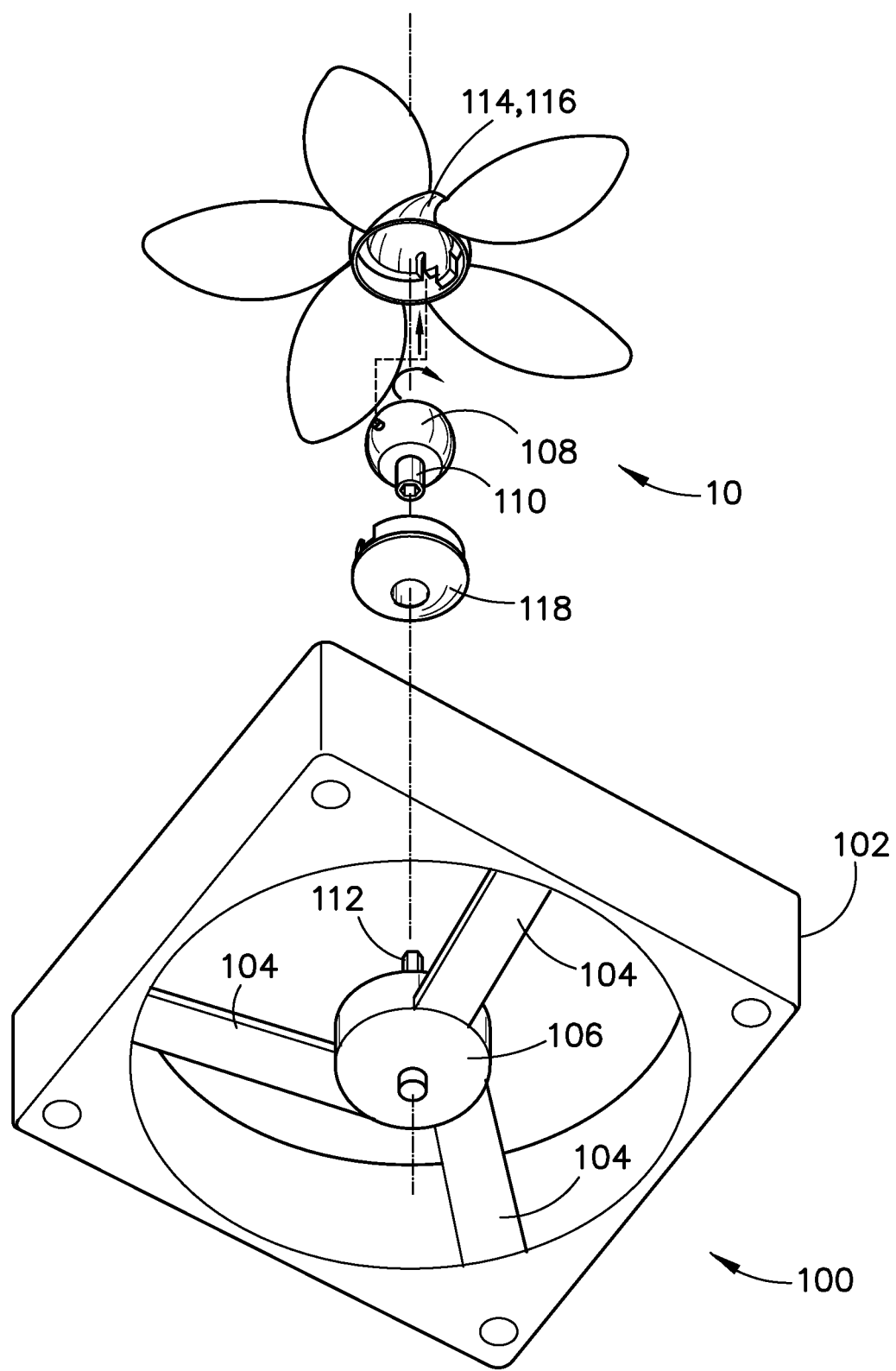
FIG. 5 is an exploded perspective view of a rotor coupling in accordance with a second embodiment of the present invention.
Figure 6:
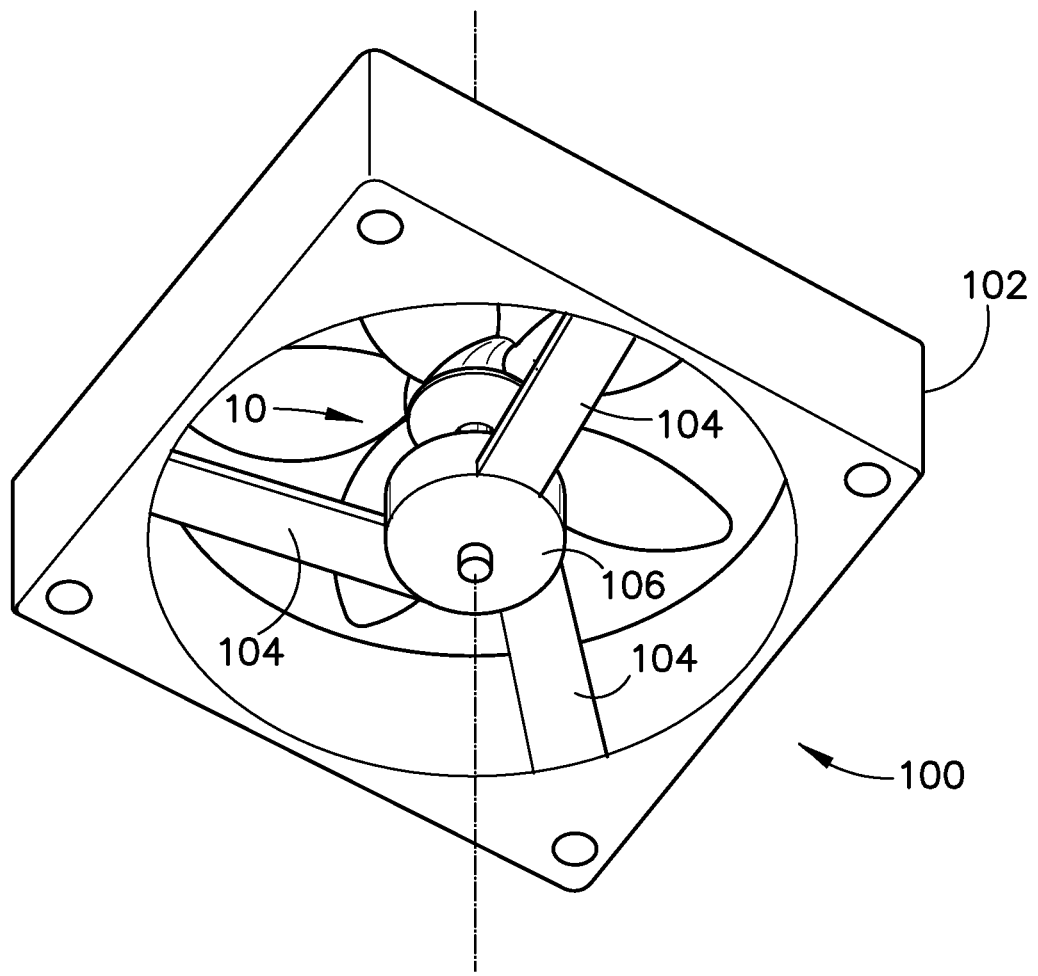
FIG. 6 is an assembled perspective view of the rotor coupling of FIG. 5.

Referring to FIGS. 5 and 6, there is shown a further embodiment of the rotor coupling of present invention. In this embodiment, the rotor coupling 10 is incorporated into a cooling fan assembly 100 used on electrical appliances such as a computer. As those skilled in this particular art will appreciate, one problem synonymous with these types of cooling fans is the noise generated during their operation. Therefore, in this embodiment the rotor coupling 10 is incorporated into a cooling fan assembly 100 typically used to cool an electrical appliance such as a computer.

The fan assembly 100 includes a housing 102 having radial support members 104 for supporting an electric motor 106. With specific reference to FIG. 5, it can be seen that the first member 108 of the rotor coupling includes an output shaft 110 for locating engagement with the output shaft 112 of the electric motor 106. As in the first embodiment, the second member 114 is integral with the hub of a fan rotor 116. In this way, once assembled, the rotor coupling components will have a minimal impact on the overall size of the cooling fan assembly. A cover 118 is again provided to retain the first member in position. Also, in a similar way to the first embodiment, the materials for the components will be of the type that is low in friction, high in strength and durable.

In use, since to the rotation axis or the second member 114 and fan rotor 116 are free to angularly vary with respect to the rotation axis of the first member 108 and electric motor 106, the fan rotation will be self balancing and therefore quieter in operation. To this end, electrical devices using this cooling fan assembly will be relatively quieter in operation whilst using less energy than prior art fans.

Figure 7:
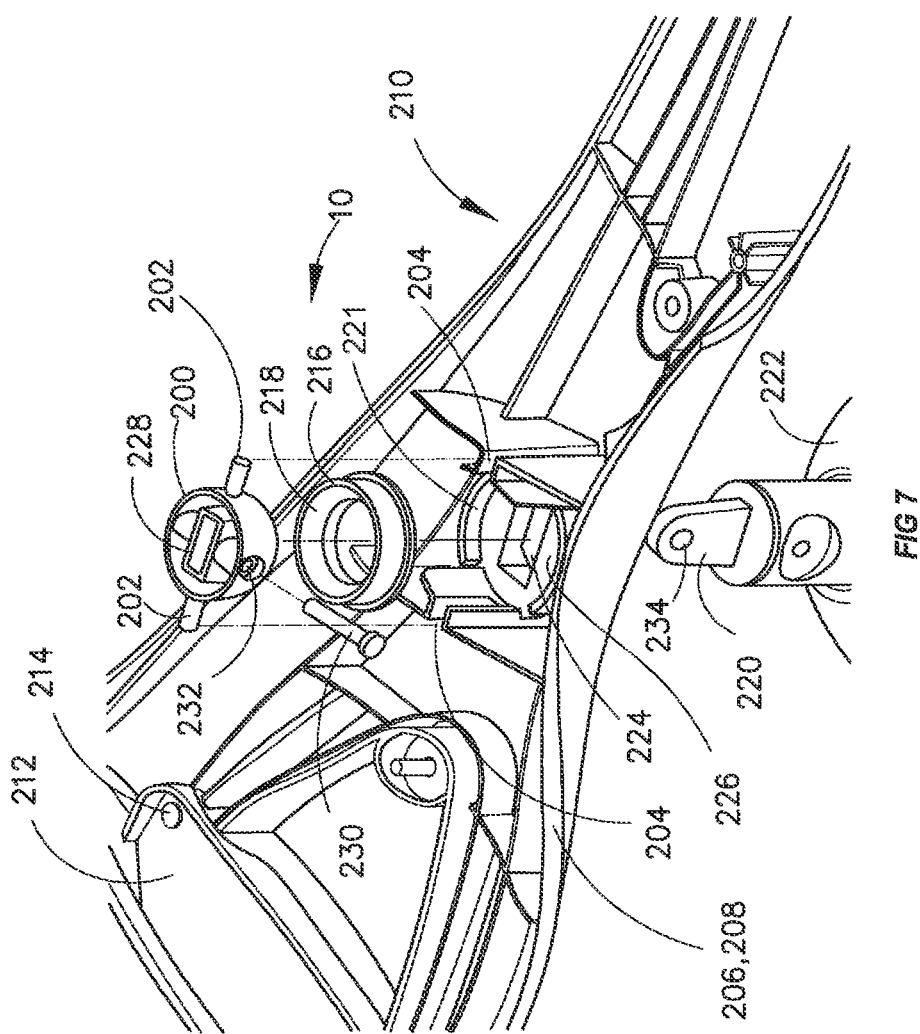
FIG. 7 is an exploded view of a rotor coupling in accordance with a further embodiment of the invention.
Figure 8:
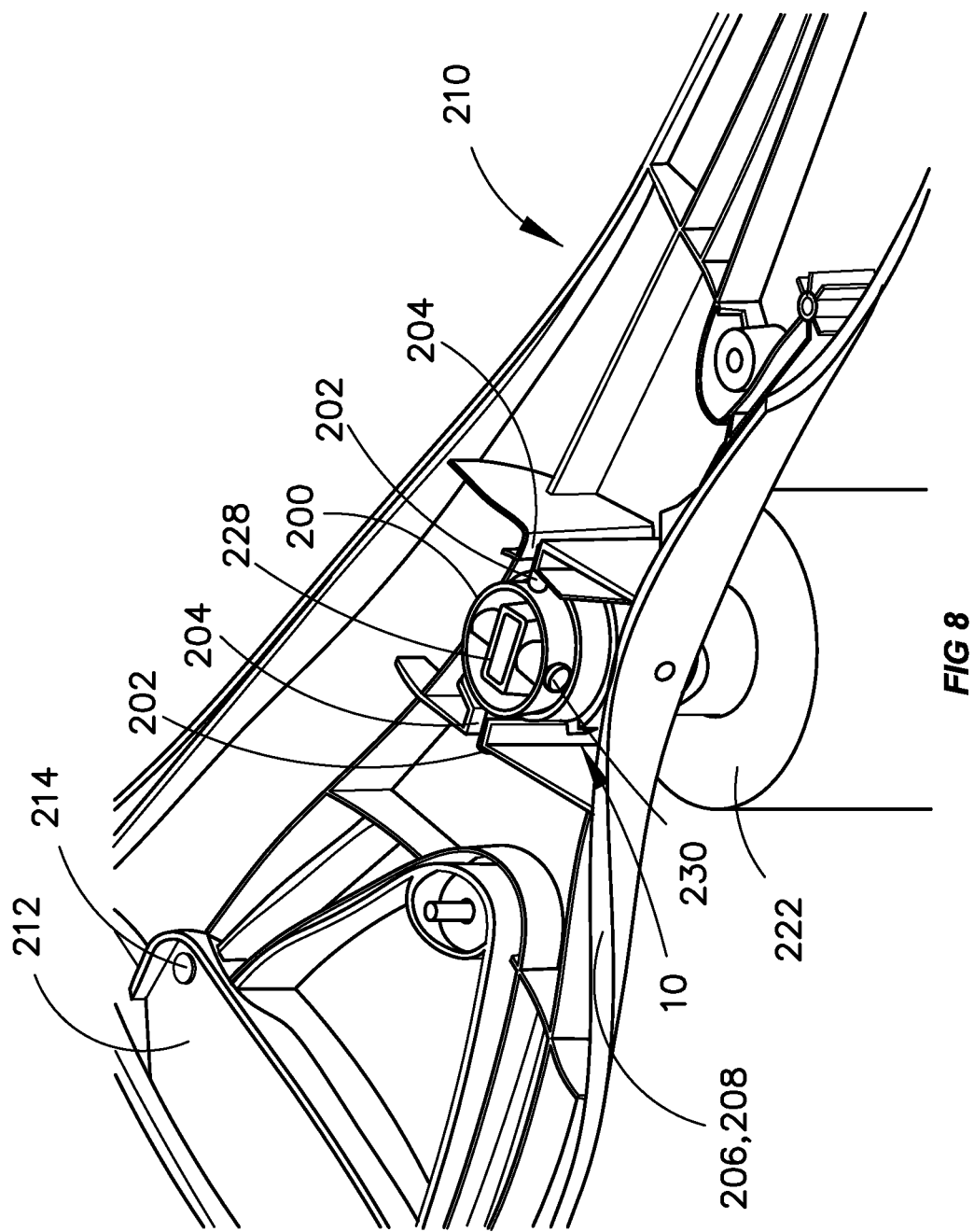
FIG. 8 is a perspective assembled view of the rotor coupling of FIG. 7.

Referring to FIGS. 7 and 8, a further embodiment of the rotor coupling 10 of the present invention is depicted. In this embodiment, the first member 200 includes two torque pins 202, which engage with corresponding elongate recesses 204 disposed in the second member 206. Specifically, the second member 206 is in the form of a generally hollow hub 208 of a fan blade assembly 210.

The fan blade assembly includes a centrally disposed and hollow hub 208 and fan blades 212 connected to the hub using screw connections 214. In a different way to the above embodiments, however, a separate bearing ring 216 including bearing surface 218 is now provided. The bearing ring 216 is housed within the hollow hub 208 proximate the elongate recesses 204 and retrained in position by locating edge 221.

As best shown in FIG. 8, the first member 200, which is again generally part spherical in shape, contacts the bearing ring 216 upon assembly and is supported in position by the bearing surface 218. The bearing surface 218, in turn, is generally inversely curved so as to be complementary to the spherical shape thereby allowing the relative axial movement between the first and second members. When in this position, the two diametrically opposed torque pins 202, extending radially from the surface of the first member, engage the corresponding recesses 204 to transfer torque from the first to the second member. It should be noted that in order to simplify manufacture, the two torque pins 202 could be in the form of a single pin located in the centre of the first member to protrude out both sides.

A rectangular shaped input shaft 220 extends from an electric motor 222, through an aperture 224 in the wall 226 of the hub 208 and into a complementary slot 228 disposed in the first member 200, thereby to transfer input torque. The assembly is held in position by pin 230 entering through bore 232 in the proximal end first member, through a hole 234 in the input shaft 220 and threadingly locked in position at the distal end.

It is proposed to form the first member 200 from high-density, low friction plastics materials such as high-density polyethylene, Delrin®, Acetyl, Teflon, nylon or a combination thereof in order to operate substantially lubricant free as well as being durable and quiet in operation. The bearing ring can be formed from a metallic material such as mild steel, thereby defining a low friction durable slidable engagement. The torque pins can be co-formed with the first member or from a separate component formed from stainless steel or chrome steel or even brass having known failure loads and the fan blades formed from ABS, ABS blend, carbon fibre or even glass filled nylon as is commonly known in the art.

As mentioned earlier, having two torque pins allows more torque to be transferred from a prime mover to the rotor. At the same time, this arrangement allows axial movement between the axis of rotation of the first member 200 and the axis of rotation of the second member 206 in a similar way to the previous embodiment shown on FIG. 4. Accordingly, this embodiment similarly provides a rotor coupling that allows the rotor or fan blade assembly 210 to self balance finding its ideal angular position, and therefore be quieter during rotation.

In a further application (not shown), the rotor coupling is used in a liquid pump to couple an impeller to a prime mover to generate a liquid flow. In this application, greater energy efficiency is provided as well reduced noise and reduced wear on components.

In the above mentioned embodiments of the present invention, the first input member having a first axis of rotation is freely angularly variable with respect to the second output member having a second axis of rotation. However, in another not shown embodiment, an angular actuator may be provided in order to selectively control the degree of angular variation between the first and second axes. In this regard, it is proposed that the actuator will be hydraulic, pneumatic or electrically motivated and controlled by a microprocessor. In this way, the direction of fluid flow may be selectively controlled based on preselected desired criteria.

Using this actuator, the rotor coupling can be used in a power generator where the torque flow is reversed compared to an air fan or fluid pump and the rotor transmits torque to a generator. In one example of this application, the rotor coupling is used in a wind powered generator, and the rotor is advantageously directed towards the stronger prevailing winds. Similarly, if the rotor coupling was used in a wave energy generator the rotor/impeller could again be directed to capture the stronger liquid flows based on the wave and tide movements making a more efficient power generator.

Additionally, it should be understood that the rotor coupling may be used in an application where the torque transfer is reversed and where an actuator controlling relative angular movement between the first and second members is not used. Using this type of rotor coupling in, for example, a wind generator would allow the wind turbine to also be self balancing, automatically finding an ideal position making it more efficient and quieter in operation.

It will be appreciated that the rotor coupling of the present invention provides a device for transmitting torque from a prime mover to a rotor, or from the rotor to a generator, that is quieter and more efficient than prior art couplings. Advantageously, the rotor coupling is made from common materials and is therefore inexpensive to manufacture.

In addition to the applications mentioned above, the rotor coupling will also find use in many applications including medical devices, laboratory equipment, transport equipment were cooling and heating are required, mining and petrochemical industries, wood and paper industries and generally any industry where air or liquid displacement devices are used.

Although the invention has been described with reference to specific examples, it will be appreciated by those skilled in the art that the invention may be embodied in many other forms.

The claims defining the invention are as follows:

1. A rotor coupling for an air displacement rotor, said coupling including:
   a first member rotatable about a first axis of rotation;
   a second member substantially disposed within a hub of said air displacement rotor, said second member being in angularly variable engagement with said first member for allowing said second member and said hub to rotate about a second axis of rotation;
   one side of said air displacment rotor having an input aperture for receiving said first member, whereby said input aperture is angularly movable with respect to said first member;
   at least one torque pin for transmitting torque between said first and second members, wherein angular variation between said first and second axes of rotation is delimited by the width of said input aperture and wherein said first and second axes of rotation are freely angularly variable with respect to each other upon rotation of said air displacement rotor such that said rotation is substantially self-balancing during air displacement.

2. A rotor coupling according to claim 1, wherein said at least one torque pin protrudes from the surface of said first member.

3. A rotor coupling according to claim 1 including at least one elongate recess for engagement with said at least one torque pin.

4. A rotor coupling according to claim 1 including a bearing surface for supporting bearing contact with said first member.

5. A rotor coupling according to claim 4, wherein said bearing surface is in sliding support engagement with said part spherical portion of said first member.

6. A rotor coupling according to claim 5, wherein said bearing surface is adapted for complementary engagement with said part spherical portion of said first member.

7. A rotor coupling according to claim 5, wherein said second member includes said bearing surface.

8. A rotor coupling according to claim 6 including a bearing ring, said bearing ring including said bearing surface.

9. A rotor coupling according to claim 1, wherein said first member includes a part spherical portion.

10. A rotor coupling according to claim 9, wherein said at least one torque pin radially protrudes from the surface of said part spherical portion.

11. A rotor coupling according to claim 1 including two torque pins.

12. A rotor coupling according to claim 11 including two corresponding elongate recesses.

13. A rotor coupling according claim 12, wherein said rotor is in said form of a fan having said hub and a plurality of radially extending fan blades.

14. A rotor coupling according to claim 1, wherein said first member is adapted for coupling with a prime mover.

15. A rotor coupling according to claim 14, wherein said prime mover is an electric motor.

\* \* \* \* \*